(12) United States Patent
Duruoz et al.

(10) Patent No.: US 6,363,207 B1
(45) Date of Patent: Mar. 26, 2002

(54) METHOD AND APPARATUS FOR A VIRTUAL SYSTEM TIME CLOCK FOR DIGITAL AUDIO/VIDEO PROCESSOR

(75) Inventors: Cem Duruoz, San Francisco; Taner Ozcelik, Palo Alto; Gong-san Yu, Milpitas, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/177,261

(22) Filed: Oct. 22, 1998

(51) Int. Cl.[7] .............................. H04N 5/91; H04N 7/12
(52) U.S. Cl. ..................... 386/68; 386/98; 348/423.1
(58) Field of Search .................... 386/6–8, 33, 39, 386/68, 25, 96–107, 111–112; 348/423.1

(56) References Cited

U.S. PATENT DOCUMENTS

| | | | | |
|---|---|---|---|---|
| 5,502,573 A | * | 3/1996 | Fujinami | ...................... 386/65 |
| 5,521,922 A | * | 5/1996 | Fujinami et al. | ............. 370/543 |
| 5,758,011 A | * | 5/1998 | Fujinami | ...................... 386/98 |
| 5,870,523 A | * | 2/1999 | Kikuchi et al. | ................ 386/95 |
| 6,052,507 A | * | 4/2000 | Niida et al. | .................... 386/68 |
| 6,141,490 A | * | 10/2000 | Oishi et al. | .................... 386/98 |
| 6,211,800 B1 | * | 4/2001 | Yanagihara et al. | .......... 341/50 |

* cited by examiner

Primary Examiner—Wendy A. Garber
Assistant Examiner—Polin Chieu
(74) Attorney, Agent, or Firm—Wood, Herron & Evans, L.L.P.

(57) ABSTRACT

A digital video processor and operating method for a receiving raw audio and video data representing images and sound to be played. The processor includes a demultiplexer for receiving the raw audio and video data and providing demultiplexed audio and video data to a memory. A first system time clock provides first time values in response to being continuously clocked by the demultiplexer. A CPU decodes and plays back the audio and video data as a function of the audio and video PTS values. The processor further includes a second system time clock providing second time values in response to being periodically incremented by the CPU. The CPU periodically sets the second system time clock to a second time value equal to a current first time value of the first system time clock in response to a standard play mode, and the CPU periodically sets the first system time clock to a first time value equal to a current second time value of the second system time clock in response to a trick play mode.

11 Claims, 8 Drawing Sheets

METHOD AND APPARATUS FOR A VIRTUAL SYSTEM TIME CLOCK FOR DIGITAL AUDIO/VIDEO PROCESSOR

BACKGROUND OF THE INVENTION

This invention relates to the processing of digital audio and video data to be played through a television and more particularly, to the processing of audio and video data during nonstandard playback modes.

Almost all televisions manufactured today are capable of interfacing with different sources of program materials, for example, a VCR, a digital versatile disk ("DVD") player, cable, DSS, etc., that provide audio signals for creating sounds and associated video input signals for creating screen displays. Some of those sources provide digital audio and video input signals in accordance with the Moving Picture Expert Group MPEG-2 audio/video digital compression standard. Further, most televisions and/or their plug compatible program sources have user interactive capabilities with which a user may choose to have the programmed source provide a subpicture display of captions, subtitles, karaoke or simple animation on the screen along with the program material. Thus, contemporary televisions and/or DVD systems preferably have the capability of processing compressed digital input signals representing audio, video and subpicture and providing digital output signals representing the desired sound, video and subpicture images. Most often, those digital output signals are converted to analog signals for use by known analog television display units.

The implementation of digital signal processing for providing a video display and associated audio from an audio-video source of programmed material presents numerous design challenges that were not encountered in the prior processing of analog audio and video signals. For example, with digital signal processing, the audio signals and the video signals are separated and are processed independently. However, the playback of the audio and video must be synchronized, so that there is a coordinated and coherent reproduction of the desired audio and video provided from the source of program material.

The source, for example, a DVD, normally provides the audio and video data in respective data packets in an "MPEG-2" format. Each of the audio and video data packets is received from the source of video material in a continuous data stream. Each packet of video data includes a header block followed by a data block. The data block may include any number, for example one to twenty, of frames of video data that may include a full field of video data or be a coded group of pictures that includes its own header block identifying the picture type and display order. The header block for a video data packet includes control information, for example, the identity of the format of the video data, the type of compression, if used, picture size, display order, and other global parameters.

The audio data packet has a header block that again identifies the format of the audio data with instructions relating to how the audio data is to be decoded and processed to provide desired enhancements, if applicable. Following the header block, the audio data packet includes an audio data block that has any number of blocks or frames of audio data, for example, from one to approximately twenty blocks.

Subpicture data may be provided in a data packet in one of several formats. For purposes of this description, it will be assumed that the subpicture data is being provided in a Subpicture format that is defined by the known DVD standard. The Subpicture format includes a header block, a pixel data block, and a display control sequence ("DCSQ") command data block. Generally, the header is used to identify the general nature of the data. For example, the header may be used to identify the format of the data, how the pixel data is compressed, if a command structure is used, how the data is to be read, etc. In the Subpicture format, the pixel data represents color and contrast information and is compressed using known compression techniques, for example, run length compression.

Selected ones of the header blocks of the audio, video and subpicture data packets include a presentation time stamp ("PTS") value which is a time stamp that is applicable to the associated data. The PTS value is a time reference to a system time clock or counter that was running during the creation or recording of the audio and video data. A similar system time clock or counter ("STC") is also running in real time during the playback of the audio and video data, and if the audio, video and subpicture data are played back at the times represented by their presentation time stamps, the audio, video and subpicture data will be presented to the user in the desired synchronized manner. Therefore, the PTS value represents a desired time and sequence of presentation of the audio, video and subpicture data and thus, is used to synchronize the playback of the audio, video and subpicture data.

During the decoding of the audio data, it normally must be decompressed, reconstructed and enhanced in a manner consistent with the source of program material and the capabilities of the sound reproduction system. In some applications, audio data packets may contain up to six channels of raw audio data. Depending on the number of channels the sound reproduction systems can reproduce, for example, from two to six, the sound reproduction system selectively uses the channels of raw audio data to provide a number of channels of audio which are then stored in an audio FIFO.

The decoding of the video data normally requires decompression, conversion of partial frames into full frames and the recognition of full frames. The decoding of subpicture data requires the decompression of run length compressed bit maps of subpicture data. Simultaneously with the decoding process, audio, video and subpicture data is being played back to the user, and in that playback, the frames of audio and video data are being output and the subpicture is overlaid on top of the video and the reconstructed audio, video and subpicture must be synchronized in the playback process such that the audio, video and subpicture present a coordinated and coherent presentation.

As will be appreciated from the foregoing, demultiplexing the audio, video and subpicture data packets is a complex process of deconstructing the data packets and storing the necessary decoding instructions as well as the content data itself to permit the decoding and playback of the data in a synchronized manner. One such process, is described in a copending U.S. patent application Ser. No. 08/901,090 entitled Method and Apparatus for Audio-Video Synchronizing, filed on Jul. 28, 1997, and assigned to the assignee of the present application. U.S. patent application Ser. No. 08/901,090 is in its entirety hereby incorporated by reference.

The interactive nature of current entertainment equipment presents additional problems in a synchronized playback of audio, video and subpicture data. Normally, the audio and video data are played back in a standard play back mode; however, the user has the capability of interrupting the normal play mode of the video, for example, with a pause control, a fast forward control, or controls that allow the user to skip to another section of the video disk. Thus, the user can choose to playback the audio and video at different speeds and in different sequences than the speed and sequence of the audio and video recorded on the video disk. In those situations, it is necessary to automatically coordinate the decoding and playback of the audio, video and subpicture data so that it matches the current selection of the user. For example, if the user has selected the pause mode, the playback of frames of audio, video and subpicture data is halted resulting in the video and subpicture being frozen in time, and the audio muted. If the user selects slow forward, the playback of frames of audio, video and subpicture data is slowed to a speed selected by the user which results in the video and subpicture being played in slow motion, and the audio muted. Alternatively, if the user selects fast forward, the speed of playback of frames of audio, video and subpicture data is increased to a speed selected by the user which results in the video and subpicture being played faster, and the audio muted. All of the above nonstandard play or trick play modes may be selected in the forward and reverse playback directions. Therefore, it is required that the system time clock have the capability incrementing or decrementing depending on the trick play mode selected by the user.

Further, at the beginning of a movie, it is possible for a user to choose different viewing angles for different scenes in the movie. During playback of the movie, when a different viewing angle is selected, it is possible that the new scene has a PTS that is earlier than the current value of the PTS from the scene just played. Therefore, in essence, for a seamless transition from one scene viewed at one angle to a second scene viewed at a different angle, the STC must move back in time. However, the STC is generated by the demultiplexer, and the STC time values are incremented successively in time. Therefore, the STC from the demultiplexer cannot be readily used by the video decoding process to satisfy all of the interactive requirements of current playback systems.

Consequently, in a video system having a wide range of options to the standard play mode, there is a need to provide an STC capability that is almost infinitely variable to meet the requirements of all of the possible play modes that may be selected by a user.

SUMMARY OF THE INVENTION

The present invention provides a method and apparatus for improving the processing of audio and video data in response to a user selecting trick play modes of operation. The invention permits the seamless concatenation of discontinuous audio and video streams. The present invention has an advantage of providing a smooth and seamless play back with minimal distortion of both audio and video data in which both of the audio and video data have a transition that moves backward in time.

In accordance with the principles of the present invention and in accordance with the described embodiments, the present invention provides a digital video processor receiving audio and video data representing images and sound to be played. Selected portions of the audio and video data include respective audio and video PTS values representing a desired time and sequence of presentation of the audio and video data. The processor is responsive to user selections to selectively play back the video data in a standard play mode or a trick play mode. The processor has a demultiplexer for receiving the raw audio and video data and providing demultiplexed audio and video data to a memory. A first system time clock provides first time values in response to being continuously clocked by the demultiplexer. A CPU decodes and plays back the audio and video data as a function of the audio and video PTS values. The processor further includes a second system time clock providing second time values in response to being periodically incremented by the CPU. The CPU periodically sets the second system time clock to a second time value equal to a current first time value of the first system time clock in response to the standard play mode, and the CPU periodically sets the first system time clock to a first time value equal to a current second time value of the second system time clock in response to the trick play mode.

In another embodiment, the invention provides a method of incrementing a first system time clock with the demultiplexer to provide first time values. In the standard play mode, the first time values of the first system time clock are compared with the audio and video PTS values. A playback and display of the audio and video data associated with respective audio and video PTS values is generated in response to each of the respective audio and video PTS values being approximately equal to the first time values in the first system time clock. The second system time clock is periodically incremented by the CPU to a second time value equal to a current first time value of the first system time clock in response to the standard play mode.

In another aspect of the invention, in response to the trick play mode, the method detects the method detects a next audio PTS value being less than a current audio PTS value and sets the first system time clock to a value equal to the next audio PTS value. In addition, the method detects a next video PTS value being less than a current video PTS value and sets the second system time clock to a value equal to the next video PTS value.

These and other objects and advantages of the present invention will become more readily apparent during the following detailed description taken in conjunction with the drawings herein.

DETAILED DESCRIPTION OF THE INVENTION

Figure 1:
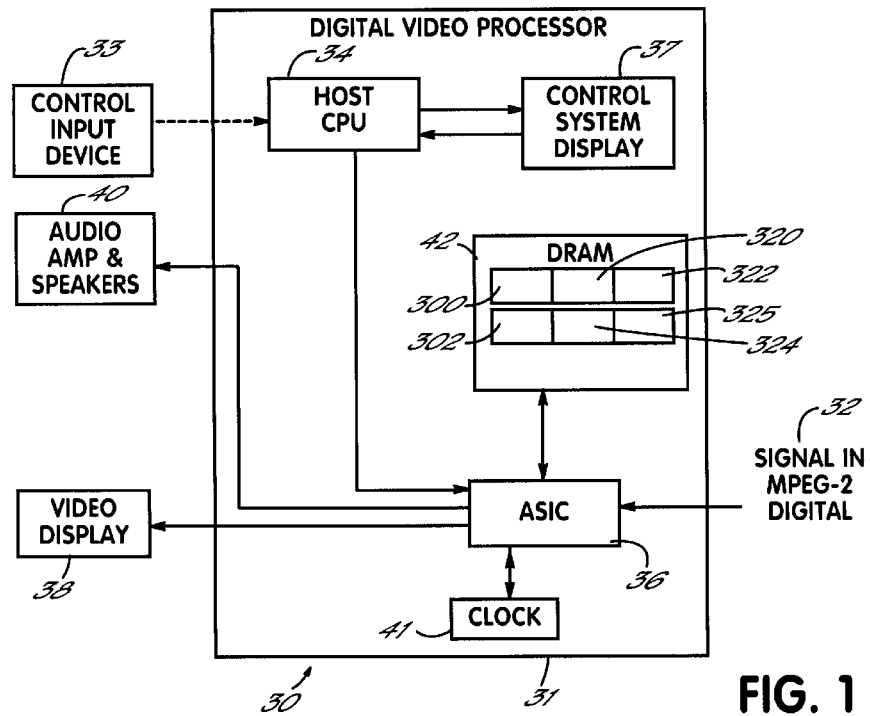
FIG. 1 is a schematic block diagram of a digital video processor in accordance with the principles of the present invention.

One embodiment of the present invention is for use in a DVD digital audio/video processor. FIG. 1 diagrammatically represents a digital audio/video processor 30 receiving and audio and video presentation system, which includes a unit processor 31 with a program signal input 32 in the form of an antenna, a cable, DVD, CD ROM or other medium through which an MPEG-2 digital input signal is received. A central processing unit or host CPU 34 which is programmed to process user commands from a control input device (not shown) operates a control system display which displays information, menu selections and other information to the user and which may or may not also function as an input device. An Application Specific Integrated Circuit ("ASIC") 36, when provided with configuration and selection information by the host CPU 34, decodes the raw signal from signal input 32 for output to the video and audio presentation devices 38 and 40, respectively. A local system clock 41 preferably is connected to the ASIC 36 and a buffer memory 42. The buffer memory 42 is an in-line, sequential memory, such as dynamic random access or DRAM memory.

The ASIC 36 is further described in commonly-assigned, copending U.S. patent application Ser. No. 08/865,749, entitled SPECIAL PURPOSE PROCESSOR FOR DIGITAL AUDIO/VIDEO DECODING, filed on May 30, 1997, which is hereby incorporated by reference herein in its entirety. A memory controller for use therewith is disclosed in commonly-assigned, copending U.S. patent application Ser. No. 08/846,590, entitled "MEMORY ADDRESS GENERATION FOR DIGITAL VIDEO", filed on Apr. 30,1997, which is hereby incorporated herein in its entirety. The above-referenced U.S. patent applications describe an application specific integrated circuit (ASIC) for performing digital video processing, which is controlled by a reduced instruction set CPU (RISC). The RISC controls computations and operations of other parts of the ASIC to provide digital video reception. Due to the limitations of the RISC, a task and stack manager procedure is required to monitor task flags, prioritize task flags, manage subroutine calls (the hardware does not support nesting of subroutine calls), and provide virtual instruction memory management. A specific processor of this kind is disclosed in commonly-assigned, copending U.S. patent application Ser. No. 08/866,419, entitled TASK AND STACK MANAGER FOR DIGITAL VIDEO DECODING, filed on May 30,1997, which is hereby incorporated by reference herein in its entirety.

Figure 2:
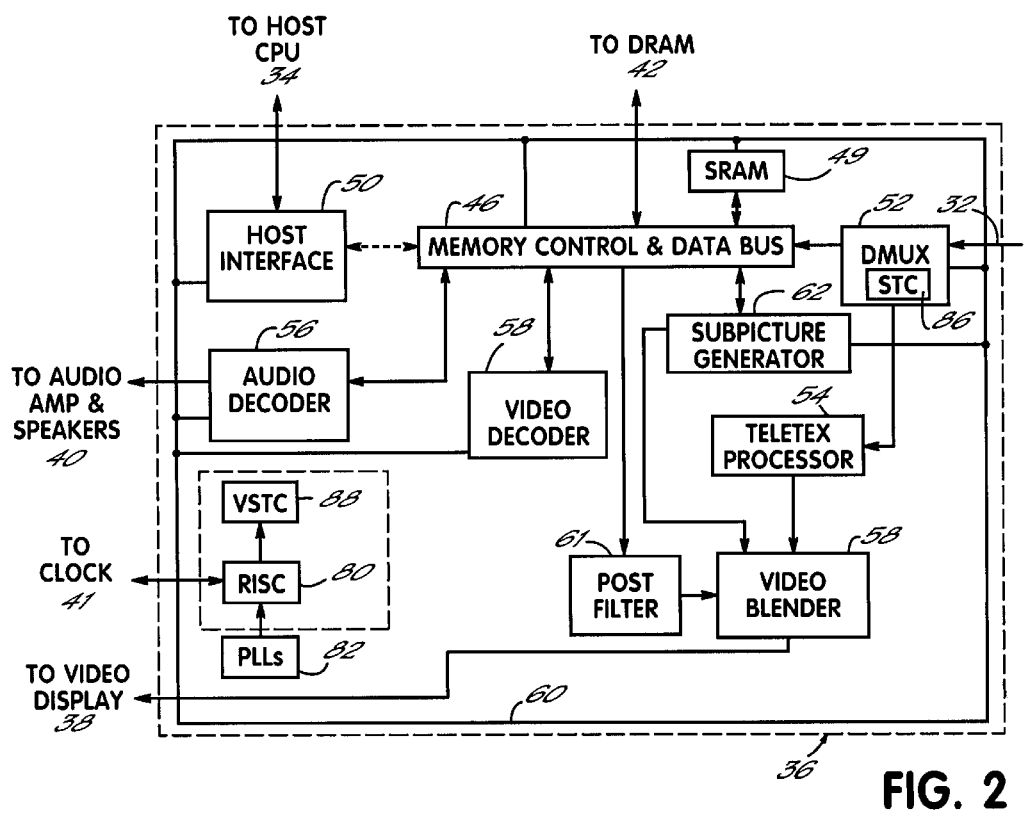
FIG. 2 is a schematic block diagram of an ASIC device within the digital video processor of FIG. 1.

Referring to FIG. 2, the ASIC 36 is a single integrated circuit chip that is logically divided into a number of components or functions. The ASIC 36 includes a memory control and data bus 46, which has at least one received data input connection and a plurality of two-way data flow connections. One of the two-way connections is to a static random access memory ("SRAM") 49 of the ASIC 36. Another of the two-way connections is to a host interface unit 50 which connects externally with the host CPU 34, and another is to the DRAM memory module 42 which is external to the ASIC 36. The ASIC 36 includes a demultiplexer or DMUX 52 which has an input connected to the signal input 32 and an output connected to the received data input of the bus 46. The DMUX 52 has a text output connected to a teletex processor 54, that is also provided on the ASIC 36 for processing collateral information such as closed caption script and other such data.

The ASIC 36 further includes an audio digital signal processing ("DSP") decoder 56, a video decoder 58 and a subpicture generating unit 62. The audio decoder 56 has an input side connected to the one of the two-way data connections of the bus 46 and an output connected to audio presentation subsystem 40. The video decoder 58 receives video data via another of the two-way data connections of the bus 46, decodes and otherwise processes the received video data, and sends the decoded and partially processed video picture data back through bus 46 to the DRAM memory 42. This processing preferably includes the application of motion compensation calculations and the construction of B-picture fields from buffered I and/or P frames and received B-picture data.

The subpicture generating unit 62 generates local picture information that includes control menus, display bar-graphs, captions, subtitles, karaoke or simple animation and other indicia used in interaction with the user. Normally, during the decoding process, video data is supplied from DRAM 42 to a video blender 58. The video blender 58 combines the program or main video with local video from the subpicture unit 62 and/or with teletex information from the teletex processor 54. The output of the blender 58 is connected to the video presentation subsystem 38.

The ASIC 36 is provided with a control bus 60 which is connected to the components in the ASIC 36. The ASIC 36 is also provided with a Reduced Instruction Set Controller ("RISC") 80, which serves as the local CPU of the ASIC 36. The RISC 80 controls the functions of the components of the ASIC 36 through control data ports connected to the control bus. The RISC 80 has a clock input that connects externally of the ASIC 36 to the system clock 41, and has another input connected to phase locked loop circuitry ("PLL") 82 within the ASIC 36 used to time internal clock signals.

Audio, video and subpicture data packets are received and demultiplexed continuously in independent parallel data streams. The decoding and playback of output frames of audio, video and subpicture data is also performed continuously in parallel data streams independent of the demultiplexing processes. Demultiplexing is a process that varies significantly in real time, depending on the nature of audio, video and subpicture data being received. In addition, the number of video frames to be presented and their order of presentation cannot be determined from the raw video data being received. The creation of video frames and their order of presentation is a function of the decoding process and is determined primarily by the control data in the header portion of the video data packet. Similarly, the raw audio data being received in the data packet bears little resemblance to the audio data output and presented, and the frames of audio data to be presented are created during the decoding process of the audio data. The subpicture data is received in a series of one or more data packets that include display control sequence ("DCSQ") commands each of which has its own start time ("STM") value. A subpicture unit ("SPU") is defined by the subpicture data occurring between subpicture data packets having a presentation time stamp ("PTS") value. The intermediate subpicture data packets contain additional DCSQ command data.

It should be noted that output audio frames can be of any length in real time, and further, several audio frames may be associated with single video frame, or in contrast, a single audio frame may be presented during video produced by several video frames. However, it is required that the frames of audio and video be played back in a synchronized manner to provide a coordinated and coherent presentation to the user. To facilitate the coordination of the presentation of the frames of audio and video data, selected ones of the audio and video data packets contain a PTS value, which is a time reference to a system counter that was running during the creation or recording of the audio and video data. A similar system time clock ("STC") is maintained and clocked in real time, for example, in register 86, by the DMUX 52; and during the demultiplexing process, audio, video and subpicture PTS values are stored in respective PTS tables. During the standard decoding and playback, the audio and video PTS values in the tables are compared to the STC times; and when a PTS value is equal to or less than the STC time, the respective audio, video and subpicture data is read from memory, decoded and played at a time and in a sequence that conforms to the how the data was recorded on the DVD.

With respect to the subpicture, the RISC 80 decodes the DCSQ commands in the subpicture during the vertical blanking period, that is, with each vertical sync period ("fid"). Upon determining the appropriate DCSQ command to be executed, the RISC 80 provides first command data, for example, subpicture location data and color and contrast data to the subpicture generator 62 and further causes subpicture pixel data and other subpicture command data, for example, a Change Color-Contrast ("CHG_COLCON") command to be provided to the subpicture generator 62 from memory 42. The RISC 80 also causes the pixel data for the video to be sequentially provided from the memory 42 to the video blender 58. Simultaneously therewith, the subpicture generator 62 provides, if appropriate, subpicture pixel data to the video blender 58. The video blender 58 utilizes a known process, for example, a mixing process, to mix the subpicture pixels with the video pixels from memory 42 and produce the desired mixed or blended video data. The blended video data is then encoded in accordance with a desired standard, for example, a NTSC or PAL standard; and thereafter, the encoded video data is converted to an analog signal and displayed on a display unit 38.

Figure 3:
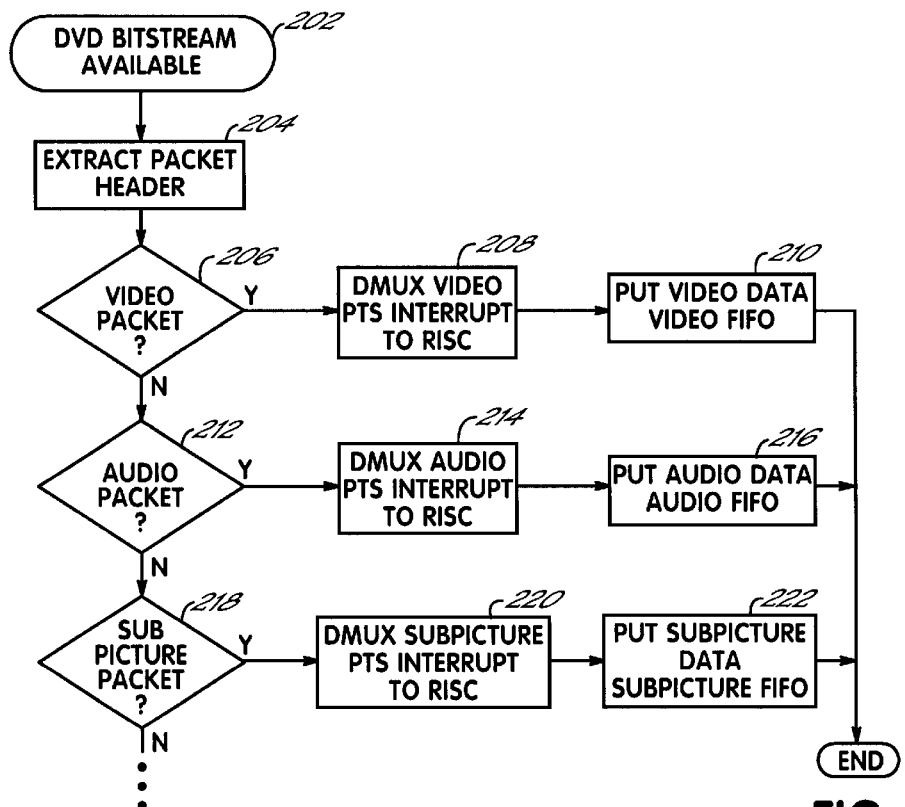
FIG. 3 is a flow chart illustrating the steps of a portion of the demultiplexing process executed by the demultiplexer in accordance with the principles of the present invention.

FIG. 3 is a flow chart illustrating the general operation of the DMUX 52 of FIG. 1. At 202, the input 32 to the multiplexer 52 continuously receives an input bit stream of data containing in random order, audio, video and subpicture data packets. The header block of data is extracted at 204, and video data packets are identified at 206. A video PTS interrupt is provided at 208 by the DMUX 52 to the RISC 80 (FIG. 2); and at 210, the video data is sequentially stored in a video data first-in, first-out ("FIFO") buffer 320 (FIG. 1) within memory 42. In a similar process, audio data packets are identified at 212, and an audio PTS interrupt is provided at 214 by the DMUX 52 to the RISC 80. At 216, the audio data is sequentially stored in a video data FIFO buffer 300 in memory 42 (FIG. 1). Subpicture data packets are identified at 218, and a subpicture demultiplexing interrupt is provided at 220 to the RISC 80. At 222, the subpicture data is sequentially stored in a subpicture FIFO buffer 322 in memory 42 (FIG. 1).

Figure 4:
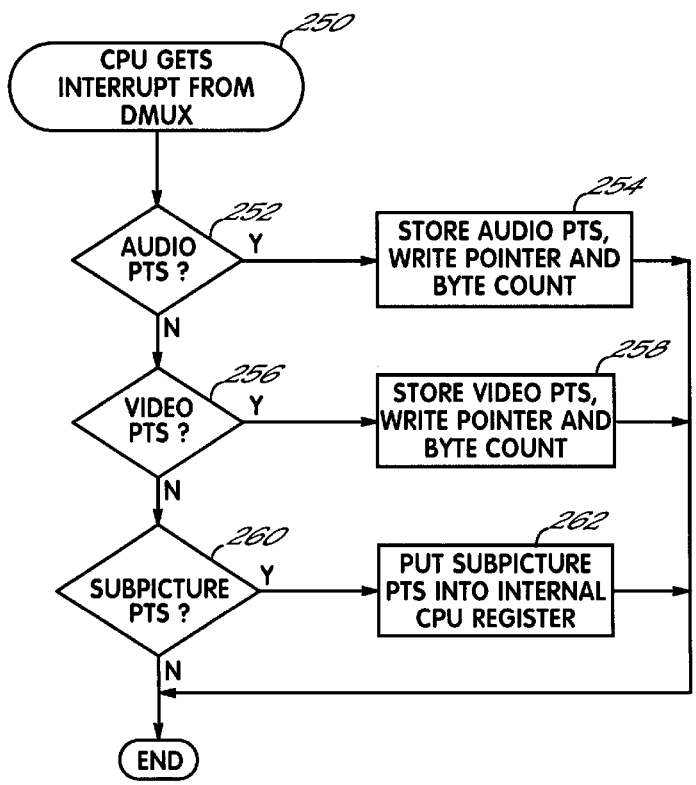
FIG. 4 is a flow chart illustrating the steps of a portion of the demultiplexing process executed by the ASIC device in accordance with the principles of the present invention.
Figure 5:
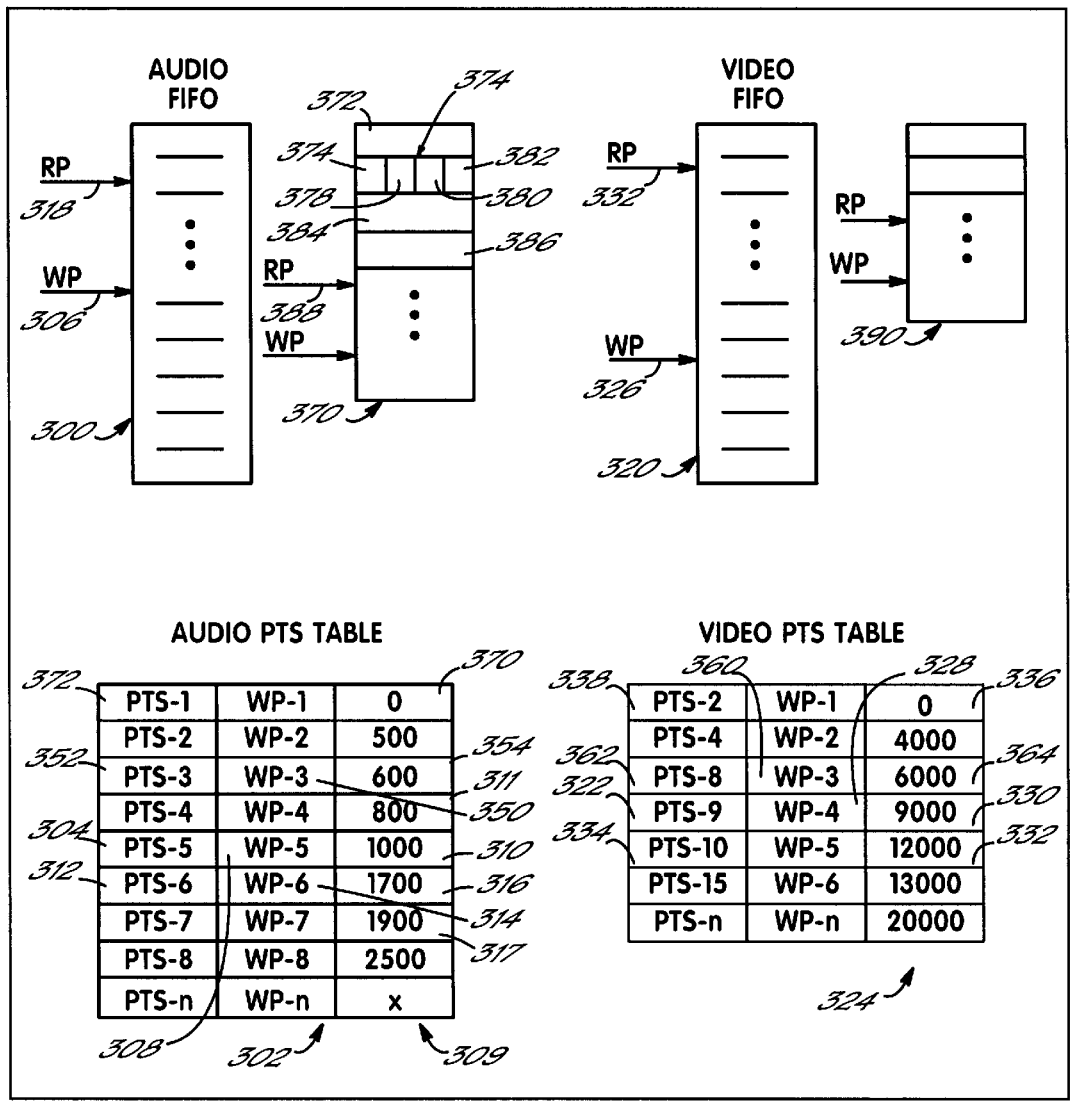
FIG. 5 is a schematic diagram illustrating audio and video FIFOs and tables within the memory of the processor utilized in the processing of the audio and video.

The demultiplexing process continues in the RISC 80 as illustrated in FIG. 4, and FIG. 5 represents how various portions of audio and video data are partitioned in the memory 42 (FIG. 1). In addition to the audio and video data FIFOs 300, 320 (FIG. 5), the memory 42 includes audio and video PTS tables 302, 324. Referring to FIG. 4, at 250, the RISC 80 services the interrupt from the DMUX 52 and determines at 252 whether the interrupt is for an audio PTS interrupt. If so, at 254, the PTS value in the header block of the audio data packet is loaded into audio PTS table 302, for example, at location 304. Further, the location of the write pointer 306 of the FIFO 300 associated with the location of the first byte of audio data loaded in the FIFO 300 is stored in the audio PTS table 302, for example, at location 308.

As previously mentioned, a PTS is provided with only selected audio data packets. The DMUX 52 counts the number of bytes between those PTS values and loads those byte counts into byte counters, for example, at 309 of the audio PTS table 302. In addition to a PTS value being loaded into an appropriate memory location, for example, memory location 304, the number of bytes counted by the DMUX 52 from the last audio PTS value to the current PTS value is added to the byte count in the prior table location, for example, table location 311; and the sum is written into the byte counter associated with the current PTS, that is, byte counter 310. For example, if a PTS is loaded in memory location 304 and the number of bytes counted by the DMUX is 200, that number, 200, is added to the previous count, 800, in byte counter 311; and the sum, 1000, is written into the counter location 310.

As will subsequently be explained, while the audio demultiplexing process is being executed, the process of decoding and playing back audio frames is also running simultaneously and in parallel with the demultiplexing process. Consequently, as will be appreciated, the values in the audio PTS table 302 are continuously changing during the demultiplexing process, audio data is written into the audio FIFO 300; and in a simultaneously running, parallel decoding process using the PTS table 302, the audio data is also being read from the FIFO 300, decoded into output audio frames and output to the user.

At 256 of FIG. 4, the RISC 80 determines whether the interrupt is for a video PTS. If so, at 258, the video PTS value is sequentially stored in video PTS table 324 (FIG. 5) at, for example, location 322. Further, the location of the write pointer 326 of the video FIFO 320 when it stores the first byte of video data for that packet is written into video PTS table 324, for example, at location 328. The video PTS table 324 also has a byte counter, and during the demultiplexing process, the RISC 80 sets a byte counter location, for example, location 332, associated with the PTS in location 334, to a value equal to the number of bytes counted by the DMUX 52 from the last PTS value plus the byte count in the prior byte counter, that is, byte counter 330.

If, at 260 of FIG. 4, the RISC 80 determines that the interrupt is for a subpicture PTS; at 262, the RISC 80 stores the subpicture PTS into a location 325 (FIG. 1) in memory 42. A PTS value is included with every subpicture data packet, and the corresponding subpicture is output when the STC time equals the stored PTS. As subpicture synchronization is not as critical as audio/video synchronization, processing of the subpicture data will not be discussed further.

After servicing a demultiplexing interrupt, the demultiplexing process as described with respect to FIGS. 1–5 continues in a similar manner. Raw audio data in the next audio data packet is sequentially loaded into the audio FIFO 300. If the next audio data packet does not have a PTS in its header block, a PTS entry is not made to the audio PTS table 302. If, however, the next audio data packet contains a PTS, that PTS is written into table 302. The write pointer location at which the write pointer loads the first audio data for the current audio data packet into FIFO 300 is loaded into PTS table 302. In addition, the number of bytes counted by the DMUX between the PTS values is also loaded in the PTS table 302. Further, with each successive video and subpicture data packet, the respective raw video and subpicture data is sequentially loaded in the respective video and subpicture FIFO's 320, 322; and if appropriate, PTS values are loaded in the respective PTS tables 324 with the respective write pointer locations and byte counts. The demultiplexing process of the audio, video and subpicture data packets proceeds in the same sequential manner to load the respective FIFOs 300, 320, 322 and PTS tables 302, 324, 325 with the appropriate data.

As will be appreciated, during the demultiplexing process, data is written into the respective audio, video and subpicture FIFOs 320, 300, 322 as a function of the requirements of the demultiplexing process. Further, during the demultiplexing process, the PTS values are disassociated with their respective audio, video and subpicture data and stored in the respective PTS tables 302, 324. In simultaneous and parallel processes, the audio, video and subpicture data is read from the FIFOs 320, 300, 322 and output to the user. During the decoding process, the read pointers of the respective audio and video FIFOs 320, 300, 322 are being moved automatically and continuously by a controller in the memory 42; and hence, the read pointers are not normally controlled by specific instructions from the RISC 80. In order to synchronize the playback of frames of audio, video and subvideo data, the streams of audio, video and subpicture data being read from the respective FIFOs 320, 300, 322 must be reassociated with the appropriate PTS values stored in the audio, video and subpicture PTS tables 302, 324, 325.

Figure 6:
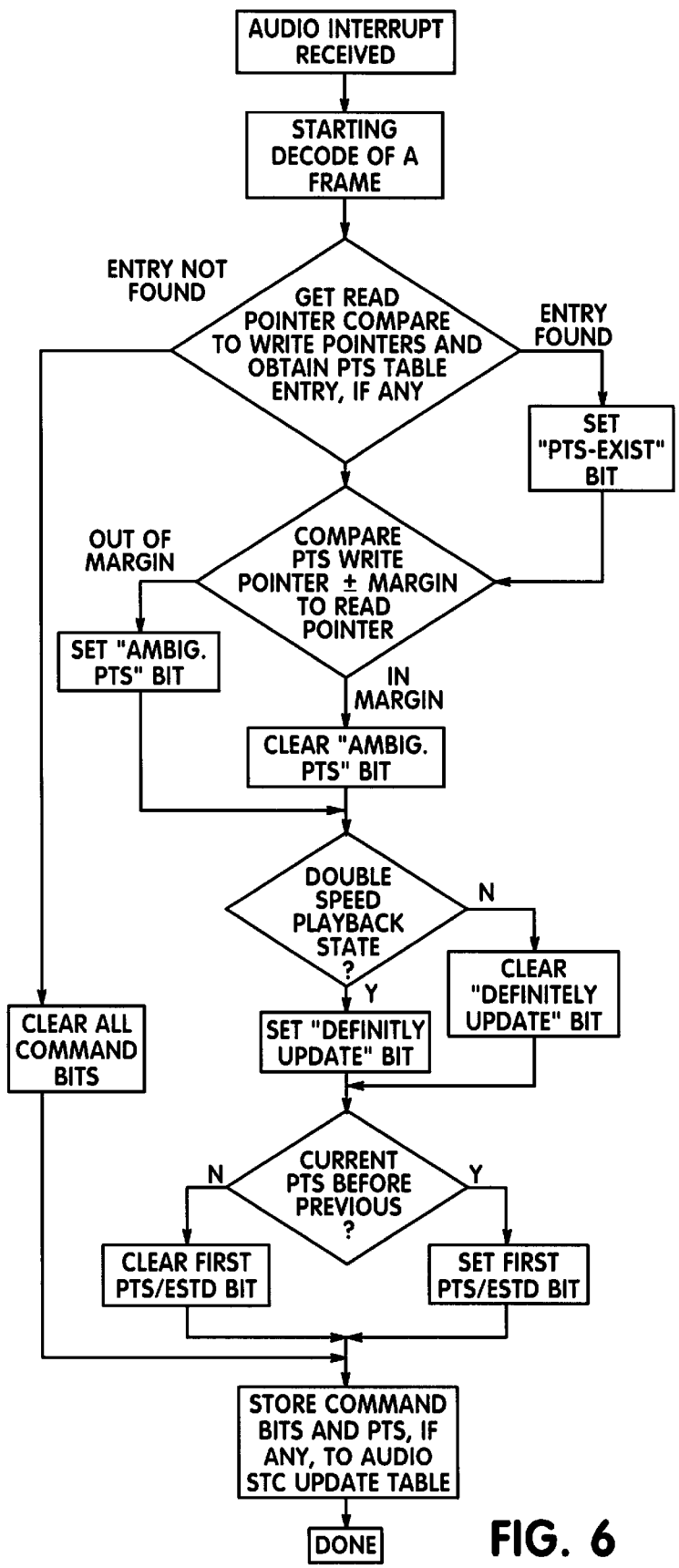
FIG. 6 is a flow chart illustrating steps of a portion of an audio decoding process executed by the ASIC device in accordance with the principles of the present invention.
Figure 7:
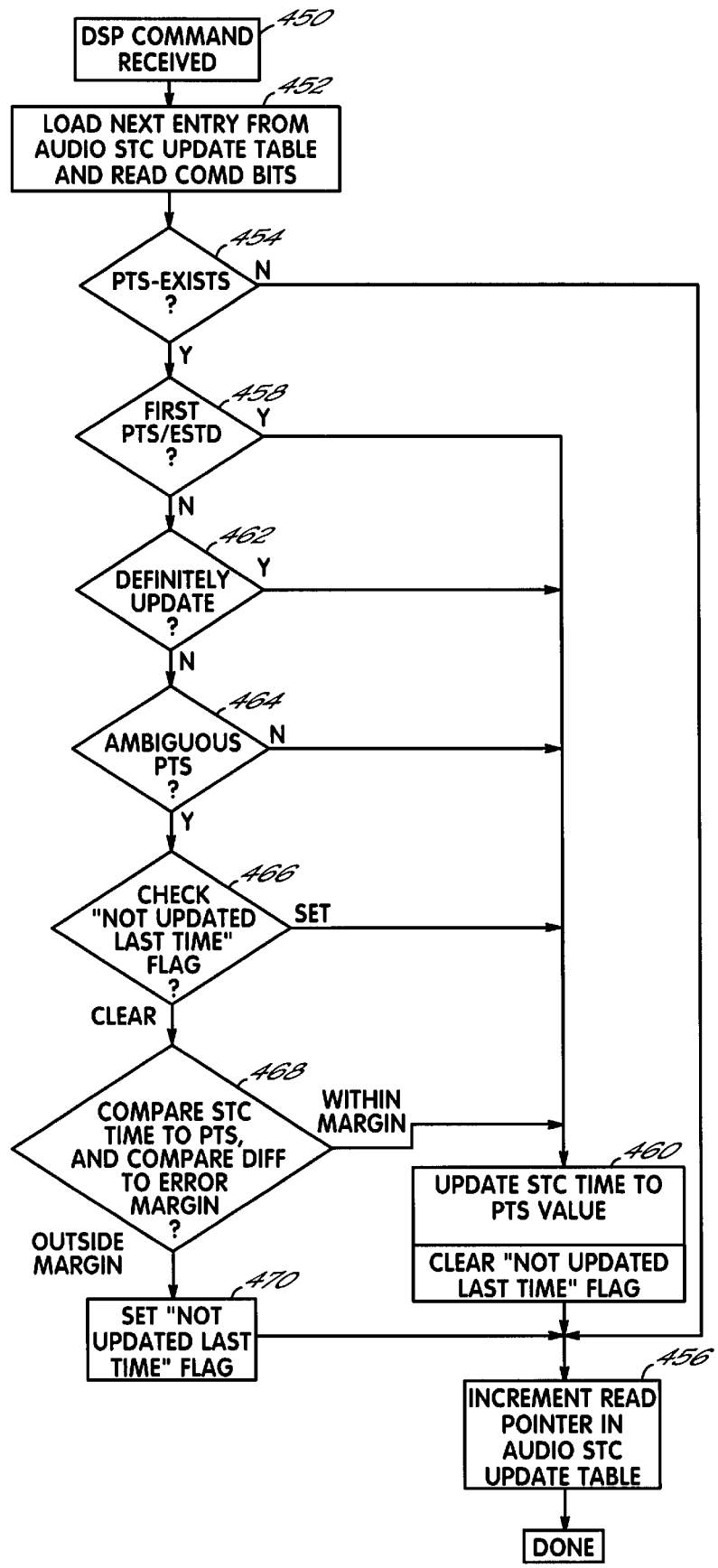
FIG. 7 is a flow chart illustrating other steps of a portion of the audio decoding process executed by the ASIC device in accordance with the principles of the present invention.

Normally, the STC 86 is initialized by instructions from the RISC 80 with a time value equal to the PTS value of the first video frame decoded and played back. Thereafter, the DMUX continuously increments the STC 86 even during periods in which the DMUX is not executing a demultiplexing process. During the standard playback mode, the STC 86 is used to synchronize the playback of audio, video and subpicture. Audio decoding and STC updating processes or subroutines are schematically illustrated in the flowcharts of FIGS. 6 and 7. The process of FIG. 6 is a portion of the audio decoding process directed to determining the instructions during the standard play mode which will control the updating of the time values in the STC 86, if required; and the subroutine of FIG. 7 is directed to the process of updating of the STC 86 by the RISC 80 as the audio data is being read from the FIFO 300. Referring to FIG. 6, the audio decoding subroutine is initiated by the RISC 80 in response to the RISC 80 receiving an audio decode interrupt at 402 from the audio DSP decoder 56, and the RISC 80 first, at 404, buffers the audio frame number. Next at 406, the RISC 80 reads the current location of the read pointer 318 of the audio FIFO 300 and compares the read pointer location to the audio write pointer values in the audio PTS table 302. The write pointer values in the PTS table 302 are only associated with audio blocks having a PTS value, however, normally, there are many frames of audio data within each of the blocks of audio data. Therefore, as the read pointer moves through the FIFO 300, the decoding process at 406 is detecting when the read pointer moves past one of the write pointer values stored in the PTS table 302. If the change in the read pointer location from the previous read pointer value to the current read pointer value does not cross over a stored write pointer value, no PTS entry is found; and the decoding process at 408 clears all of the buffered command bits. However, if the change in the audio read pointer location from the previous read pointer value to the current read pointer value crosses a write pointer value stored in the PTS table 302, a write pointer value and a PTS value associated with that write pointer are considered found; and the decoding process at 410 buffers a "PTS exists" bit.

The decoding process then at 412 finds the difference between the current read pointer value and the found write pointer value and compares that difference to a maximum allowable difference defined as an ambiguity margin. The ambiguity margin a byte count determined as a function of the expected motion of the read pointer 318 during a maximum time delay of the RISC 80 in responding to the audio decode interrupt. If the difference is inside the ambiguity margin, the process at 414 sets and buffers an "ambiguous PTS" bit; and if the difference is outside the ambiguity margin, the process at 416 clears the "ambiguous PTS" bit buffer.

The decoding process at 418 then determines whether the user has selected the double speed playback mode. If so, a "definitely update" bit is set in a buffer at 420; and if not, the "definitely update" bit is cleared at 422. The RISC 80 in the decoding process then at 424 determines whether the current PTS value is less than the prior PTS value. User selections can create such a situation, and for purposes of this application, that condition is defined as an extended system target decoder ("ESTD") state. If the RISC 80 detects a reduction in the PTS value, a "first PTS/ESTD" bit is set and buffered; and if not, the "first PTS/ESTD" bit buffer is cleared. Thereafter, the RISC 80 at 430 stores the states of the playback instructions in an audio STC update table 370 (FIG. 5) within the DRAM 42. The "PTS exists", "ambiguous PTS", "definitely update" and "first PTS/ESTD" command bits are stored in locations 376, 378, 380 and 382, respectively. In addition, the RISC 80 stores the found incoming PTS value from the audio PTS table 302 and the current audio frame number in locations 382 and 384, respectively, of the audio STC update table 370.

While the audio decoding process of FIG. 6 is determining the playback instructions for the current read pointer location of the audio FIFO 300, the process of FIG. 7 is simultaneously running to determine whether the STC 86 should be updated by the RISC 80 as a function of the playback instructions currently in the audio STC update table 370. The STC 86 is continuously clocked by the DMUX 52; and ideally, the time values in the STC 86 should correspond to the detected PTS values in the audio PTS table 302 as the read pointer moves through the audio FIFO 300. However, there are situations in which that will not be true. For example, there may be discontinuities in the incoming PTS values in the incoming audio and video bit stream because the user is interrupting the playback and choosing different playback options. Consequently, as changes in the incoming PTS values are detected, the STC 86 is updated by the RISC 80 so that its time value corresponds to the current PTS values being processed.

The audio STC update table 370 contains a plurality of entries, and each entry includes the four command bits just described, a current incoming PTS value and a frame number. Upon the STC update subroutine at 450 detecting an audio decode interrupt from the audio DSP decoder 56, the subroutine at 452 reads the four command bits, the current incoming PTS value and the current frame number from the next entry in the audio STC update table 370. Thereafter, at 454, the STC update subroutine checks the state of the "PTS exists" bit. If the bit is cleared because a PTS value was not detected by the process of FIG. 6, the process at 456 increments the pointer in the read pointer 388 of the audio STC update table 370 (FIG. 5).

If the subroutine at 454 detects that the "PTS exists" bit is set, the update STC process of FIG. 7 then at 458 checks the state of the "first PTS/ESTD" bit at 458. The "first PTS/ESTD" bit is set in response to detecting that the current PTS value is less than the prior PTS value; and thus, there is a discontinuity in the PTS values. Consequently, the time value in the STC 86 must be immediately set back to the PTS value corresponding to the detected lesser PTS value. If the "first PTS/ESTD" bit is set, the subroutine at 460 causes the RISC 80 to set the STC time value equal to the detected lesser PTS value. In addition, the RISC 80 clears the "not updated last time" flag which keeps track of whether the STC time was updated during an execution of the subroutine of FIG. 7. Clearing the "not updated last time" flag indicates that the STC time was updated during this pass through the subroutine of FIG. 7.

If at 458, the process detects that the "first PTS/ESTD" bit is not set, the process then at 462 proceeds to check the state of the "definitely update" bit. The "definitely update" bit was set in response to detecting the double speed playback mode. Since the STC 86 is normally clocked at a constant rate by the DMUX 86, the DMUX cannot accommodate different playback speeds; and therefore, in the double speed play mode, the STC times must be set to incoming PTS values by the RISC 80 as those incoming PTS values are detected. Thus, if the double playback speed is known by detecting that the "definitely update" bit is set, the RISC 80 at 460 updates the time in the STC 86 to the current PTS value. As will be appreciated, the user can provide many forward and reverse playback speeds, and the RISC 80 can control the times in the STC 86 by a similar process and by other processes as will be later described.

If the "definitely update" bit is not set, the process at 464 proceeds to check the state of the "ambiguous PTS" bit. The "ambiguous PTS" bit was set in response to detecting that read pointer value was inside an ambiguity margin with respect to the detected write pointer value. If the read pointer value is inside the desired margin, it may not be desirable to update the STC time with the current incoming PTS value; but instead, it may be better to wait until the next iteration of the subroutine. However, it is equally undesirable that the time values in the STC 86 not fall too far behind detected PTS values; and therefore, if the STC 86 was not updated during the last iteration of the subroutine of FIG. 7, it will be updated this iteration even though the "ambiguous PTS" bit is set. Thus, if at 464, the "ambiguous PTS" bit is not set, the RISC 80 at 460 updates the STC time to the detected PTS value. Further, if at 464, the "ambiguous PTS" bit is set and, at 466, the "not updated last time" flag if set, the RISC 80 at 460 updates the STC time to the detected PTS value.

If the "ambiguous PTS" bit is detected set at 464 and the "not updated last time" flag is clear at 466, the process then at 468 calculates the difference between the time value in the STC 86 and the detected PTS value in the STC update table 370. As previously mentioned, it is desirable that the STC time not fall too far behind the PTS value of the audio data currently to be read from the FIFO 300. The subroutine of FIG. 7 also at 468 compares the calculated difference to an error margin. If the calculated difference is inside the error margin, the time value in the STC 86 does not require adjustment by the RISC 80 and can continue to be clocked by the DMUX 52. In that situation, the subroutine at 470 sets the "not updated last time" flag; and proceeds at 456 to increment the read pointer 388 of the STC update table 370. However, if the calculated difference is outside the margin, the RISC 80 at 460 updates, the STC time to the detected PTS value and clears the "not updated last time" flag.

Figure 8:
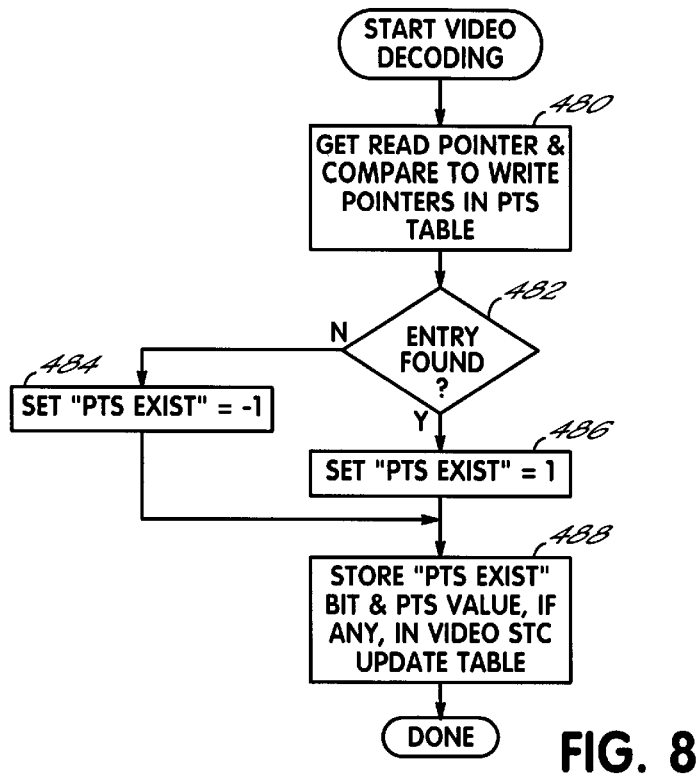
FIG. 8 is a flow chart illustrating steps of a portion of a video decoding process executed by the ASIC device in accordance with the principles of the present invention.
Figure 9:
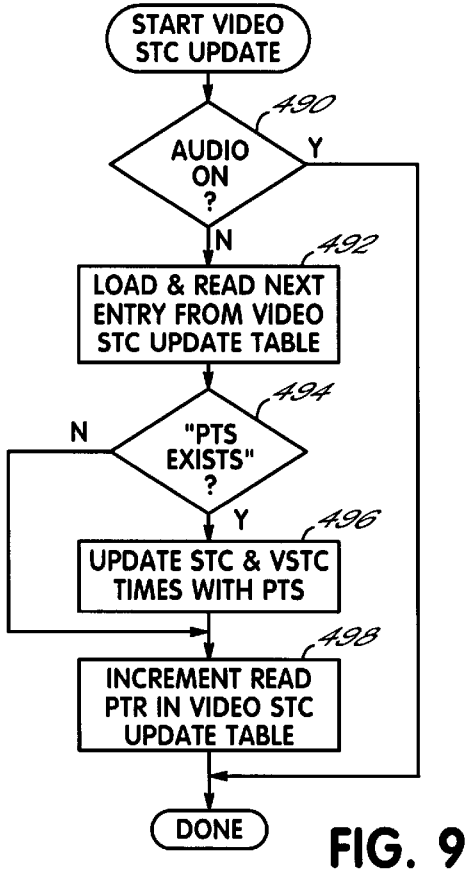
FIG. 9 is a flow chart illustrating other steps of a portion of the video decoding process executed by the ASIC device in accordance with the principles of the present invention.

Video decoding and STC update processes or subroutines are schematically illustrated in the flowcharts of FIGS. 8 and 9. The process of FIG. 8 is a part of the video decoding process directed to determining the instructions during the standard play mode which will control the updating of time values in the STC 86, if required, and the subroutine of FIG. 9 is directed to the process of updating of the time value in the STC 86 by the RISC 80 as the video data is being read from the FIFO 320 (FIG. 5). Referring to FIG. 8, the subroutine is initiated by the RISC, and the RISC 80 first, at 480, reads the current location of the read pointer 332 of the audio FIFO 320 and compares the read pointer location to the video write pointer values in the video PTS table 324. As the read pointer 332 moves through the FIFO 320, the subroutine at 482 detects whether a change in the read pointer location from the previous read pointer value to the current read pointer value crosses over a stored write pointer value. If it does not, no PTS entry is found; and the decoding process at 484 sets the "PTS exists" bit to minus one. However, if the change in the read pointer location from the previous read pointer value to the current read pointer value crosses a write pointer value stored in the video PTS table 324, a write pointer value and a PTS value associated with the write pointer is considered found; and the decoding process at 486 sets the "PTS exists" bit to one. Thereafter, the RISC 80 at 488 stores the "PTS exists" bit and the detected PTS value from the video PTS table 324 in a video STC update table 390 (FIG. 5) within the DRAM 42.

While the video decoding process of FIG. 8 is determining the playback instructions for the current read pointer location of the video FIFO 320, the process of FIG. 9 is simultaneously running to determine whether the time values in the STC 86 should be updated by the RISC 80 as a function of the playback instructions currently in the video STC update table 390. The subroutine first at 490 determines whether the audio is ON; and if it is, the subroutine ends. Discontinuities in the audio are more distracting than discontinuities in the video; and therefore, if the audio is ON, the process of FIG. 7 which utilizes the audio STC update table 370 is used to control the updating of the STC 86. However, if the audio is not ON, the process of FIG. 9 continues.

The subroutine at 492 reads the state of the "PTS exists" bit and the incoming PTS value from an entry in the video STC update table 390. Thereafter, at 494, the subroutine checks the state of the "PTS exists" bit. If the bit is set, that means no PTS value was detected by the process of FIG. 8; and process at 498 increments the pointer in the video STC update table 390 (FIG. 5). If the subroutine at 494 detects that the "PTS exists" is set, the subroutine at 498 updates the time value in the STC 86 to the detected PTS value stored in the table 390.

The above described system works well in a standard playback mode in which the STC 86 is maintained by the DMUX 52 as part of the demultiplexing process. For purposes of this application, the term "trick play" refers generically to any play back selected by the user which is not the standard, default play back mode. Nonstandard play, or trick play commands selected by the user to the host CPU 34 cause the serial stream of data to the digital audio/video processor 30 to change. For example, the execution of trick play commands by the host CPU 34 will change the operation of the device supplying the data, for example, the DVD player, and thus the bit stream of data being supplied to the digital audio/video processor 30 will change. The ASIC 36 must then modify the playback process to provide a presentation of the audio, video and subpicture that corresponds to the user's commands. However, the demultiplexing and decoding and playback processes are simultaneous and parallel processes, and it is difficult for the playback process to continuously modify the time values in the STC 86 for all of the available trick play modes. It is even more difficult for the playback process to establish new time values in the STC or cause it to run backwards to accommodate reverse playback. Further, the playback of the audio and video are coupled together by the time values in the STC 86. However, there are potential situations in which the audio and video are both playing and the user selections require that the audio and video be set back to different PTS values. In such a situation, having the playback of both the audio and video coupled to the same clock is a problem.

Therefore, with the present invention, the ASIC 36 maintains a second, virtual system time clock ("VSTC"), for example, in a store 88. Thus, in certain complex playback modes, the playback of the audio and video may be uncoupled, that is, the playback of the audio is controlled by the time values in the STC 86 and the playback of the video is controlled by the time values in the VSTC 88. The VSTC 88 is illustrated as being stored in the RISC 80, however, as will be appreciated, the VSTC maintained by the RISC 80 may be stored in other memory locations, for example, in the DRAM 42. In the standard playback mode, the value in the VSTC 88 is updated with the current time value in the STC 86 with each video frame decoded and output by the RISC 80. Thus, the VSTC time is maintained in synchronization with the STC time. However, when the user instructs a trick play mode, the playback of video data is controlled by the VSTC 88 and not the STC 86.

Figure 10:
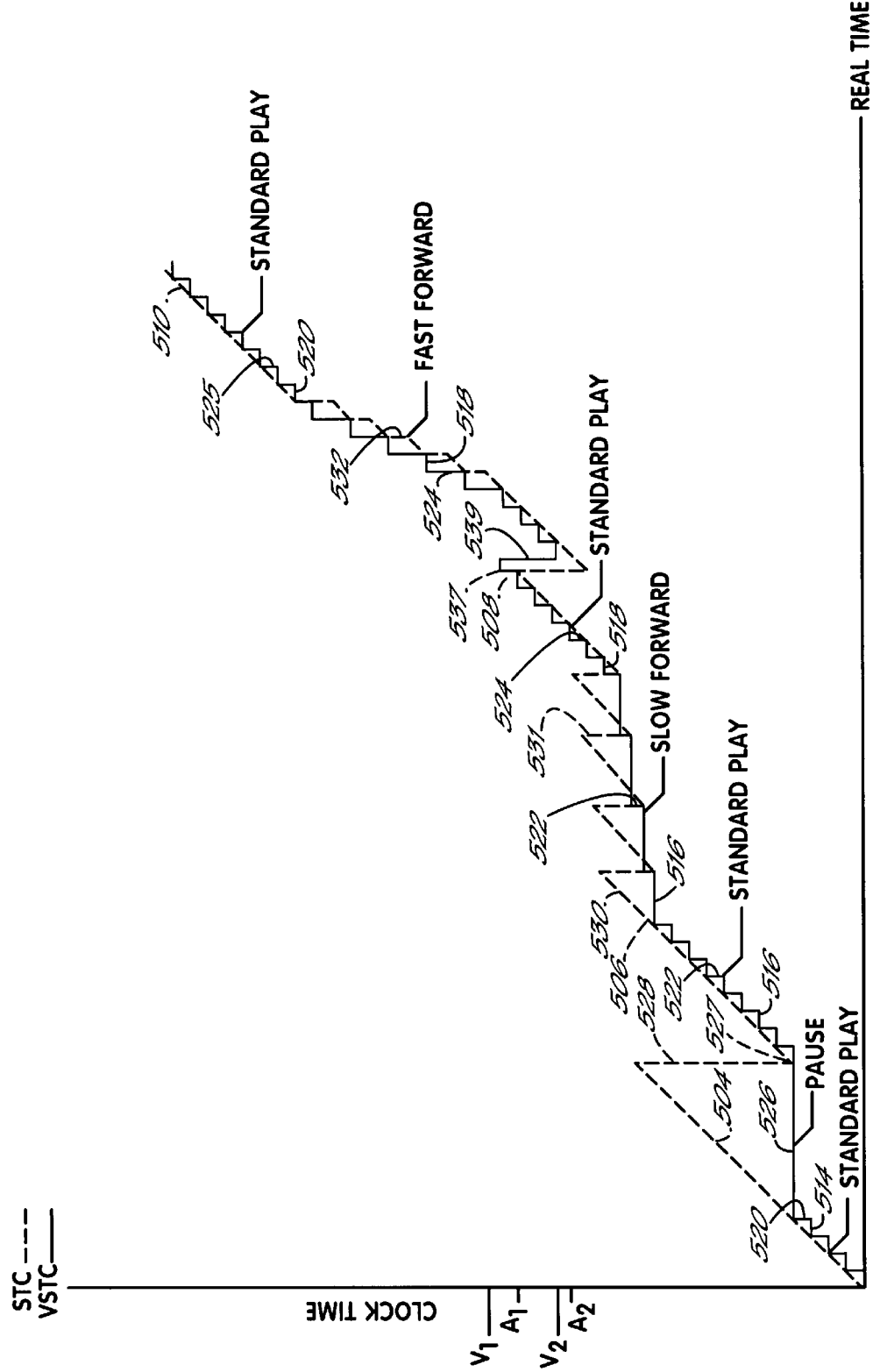
FIG. 10 is a schematic illustration of the relationship of PTS values to time using the STC and the VSTC.

Referring to FIG. 10, the relationship of the time values in the STC 86 and VSTC 88 over time are illustrated for different play back modes. The time values in the STC 86 are illustrated by the dashed lines, and the time values in the VSTC values are illustrated by the solid lines. The RISC 80 periodically checks status bits that indicate the playback mode currently activated by the user. During the standard play mode, the STC 86 is continuously clocked by the DMUX 52 and provides time values at a constant rate that are represented by dashed lines 504, 506, 508, 510. Further, in the standard play mode, the RISC 80 periodically, for example, with every decoded video frame, updates the time value in the VSTC 88 with the current time value in the STC 86. That process of periodically updating the VSTC 88 produces a stair step effect in which horizontal line segments 514, 516, 518 during which the VSTC 88 has a constant value. Then with each video frame, VSTC 88 is updated by the RISC 80 to the current time of the STC 86 as indicated by the vertical line segments 520, 522, 524, 525.

If the user enters the pause mode, the player source of the audio and video stops as does the stream of audio and video data being received by the digital video processor 30. The audio is muted; and with no new video being received by the DMUX 52, the time value in the VSTC 88 remains constant as shown by line segment 526. During the pause mode, the RISC 80 continuously repeats the current video frame, thereby providing a display of unchanging, fixed video. That display of fixed video continues until a new play mode is selected by the user. Even though the DMUX 52 in not receiving any new audio or video data, the STC 86 continues to be clocked in real time by the DMUX 52; and the time value in the STC 86 continues to increase as shown by the line segment 504 extending above the line segment 526. When a new play mode is detected at 527, the RISC 80 reads the pause time value in the VSTC 88 and updates the STC 86 with that time value as shown at 528, thereby providing a common initial time value for both clocks at the start of the new play mode.

Thereafter, in the standard play mode, as previously described, the STC 86 is clocked in real time by the DMUX 52 to provide time values as indicated at 506, and the VSTC 88 is periodically updated with each video frame by the RISC 80 with the current time value in the STC 86. If the user selects the slow forward mode, the rate at which the audio and video bit stream received by the digital audio/video processor 30 is slowed; and the RISC 80 first mutes the audio; and second, the RISC 80 uses the VSTC 88 and not the STC 86 in the playback process. The RISC 80 then determines how often the VSTC 88 is to be updated. Depending on the slow forward rate selected by the user, the RISC 80 periodically advances the VSTC 88 by an increment equal to one video frame. Thus, the VSTC 88 is maintained in a pause state at 516 for a period of time during which the RISC 80 repeats the current video frame. Then the RISC 80 advances the VSTC 88 by an increment equal to one video frame as shown at 522, and another frame of video data is played back. The slow forward playback process of pausing and then advancing by one video frame continues until a new play mode is selected by the user. During the slow forward mode, the STC 86 is clocked at its normal rate by the DMUX 52 as indicated by the line segment 530; and immediately prior to the updating of the VSTC 88, the time value in the VSTC 88 at the end of the pause is written into the STC 86, so that at a point in time indicated at 533, the VSTC 88 and the STC 86 have the same time value.

If the user selects the fast forward mode, the bit stream of audio and video data is received by the digital audio/video processor 30 at a rate greater than the standard rate. The RISC 80 again chooses to use the time values in the VSTC 88 for the playback process and determines the rate and magnitude of increments to be used to advance the VSTC 88, as indicated, for example, by line segments 518, 524. However, the time values in the VSTC 88 are changing rapidly; and the RISC 80 also controls the skipping video frames during the fast forward play back mode. A command management structure and operation is described in a copending U.S. patent application Ser. No. 09/177,214 entitled "Command Manager", filed on even date herewith, having Messrs. Tanner Ozcelik, Pattabiraman Subramanian and Ibrahim Cem Duroz as coinventors, assigned to the assignee of the present application, and which application is in its entirety hereby incorporated by reference. A process of audio/video synchronization including the repeating and skipping of frames during the standard play mode is described in detail in the earlier referenced U.S. patent application entitled "Method and Apparatus for Audio-Video Synchronizing", Ser. No. 08/901,090. Again, in a similar manner as previously described, the RISC 80 periodically at 532 updates the STC 86 with the current time value in the VSTC 88.

Thus, in the standard play mode the video is played back at a rate determined by the time values in the STC 86; however, in many of the trick play modes, the video is played back at a rate determined by the time values in the VSTC 88. In the standard play mode, with each video frame, the RISC 80 brings the VSTC 88 into synchronization with the STC 86; and in many of the trick play modes the STC 86 is periodically synchronized with the VSTC 88. The provision of the VSTC 88 provides significantly greater flexibility in that the VSTC 88 can readily follow the trick play commands of the user. It further permits different and discontinuous audio and video streams to be concatenated and played seamlessly.

When in the trick play modes, it is most important to provide continuous and seamless playback with the minimum of noise, clicks, tears and other potential distortions that may often occur during the trick play modes. During many trick play modes, the audio is muted since the playing of audio at speeds other than a standard speed is generally annoying to the user. However, there may situations in which during standard play, it is required to switch to scenes that have earlier, that is, smaller, audio and video PTS values than the current time value in the STC 86. Further, it is most desirable to switch both the audio and video to the smaller PTS values, that is, back to in time, seamlessly with a minimum of noise and distortion. The use of the VSTC 88 in combination with the STC 86 permits such an operation.

Figure 11A:
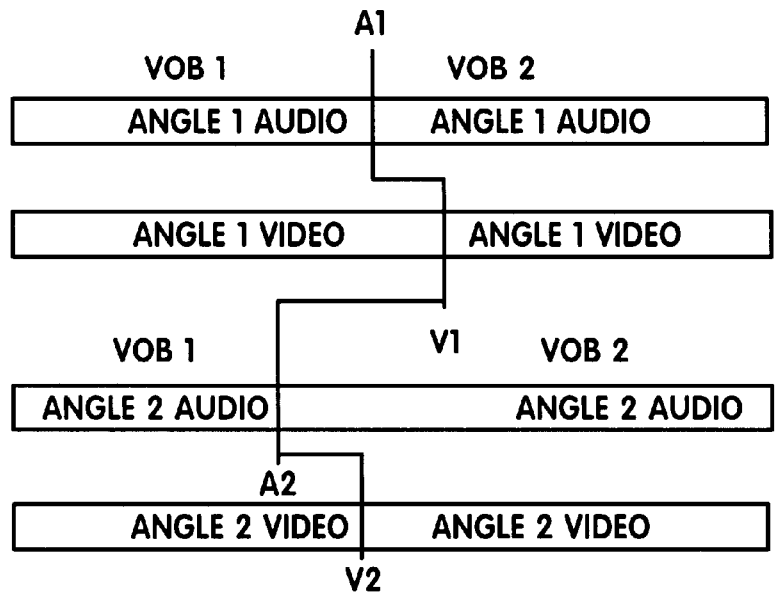
FIG. 11A is a schematic illustration of audio and video VOB data before a concatenation of two viewing angles.

As previously indicated, it is possible at the beginning of a program for the user to select different viewing angles. Therefore, as the program proceeds to play back, at preselected points, the video presentation may move from a first viewing angle to a second viewing angle. Further, it is preferred that the video present a seamless transition from the first viewing angle to the second viewing angle. However, the video PTS values across the transition may be substantially different. Referring to FIG. 11A, assume that the audio and video are playing with respect to a first viewing angle. Further, assume that at the end of video object ("VOB") 1, the user has selected a second viewing angle. In the present example, at the end of VOB 1, the angle 1 audio has an ending time $A_1$ as illustrated in FIG. 11A. However, upon switching to angle 2, the starting time for the VOB 2 audio is $A_2$ which is earlier than $A_1$. Further, at the end of VOB 1, the angle 1 video has an ending time $V_1$; and upon switching to viewing angle 2, the starting time for the VOB 2 video is $V_2$ which is earlier than $V_1$. Information relating to the VOB's including the starting and ending times of the audio and video within the VOB's is contained in navigation blocks within the incoming bit stream. The RISC 80 uses the information in the navigation blocks to identify the starting and ending times of the audio and video selected by the user to provide the desired concatenation of the audio and video signals.

In this example, the starting time for the angle 2 video is earlier than the ending time for the angle 1 video. Consequently, to have a smooth transition from the angle 1 video to the angle 2 video, without the VSTC 88, the STC 86 would have to be set back to an earlier time value. It is necessary that both the audio and video be concatenated across the two angles and at different times. Doing both with only the STC 86 is complex and difficult. However, with the VSTC 88, the audio can be concatenated with the STC 86, and the video can be concatenated with the VSTC 88. Thus, as the STC 86 is clocked, when the STC time value reaches a value corresponding to the audio PTS value $A_1$, as shown at 537 in FIG. 10, the RISC 80 moves the STC 86 backwards in time by updating the STC 86 to the earlier time value corresponding to the audio PTS value $A_2$. Further, the RISC 80 does not update the VSTC 88 with the value of the STC 86 as is normally done in the standard play mode. Instead the RISC 80 increments the VSTC 88 one count with each video frame decoded.

Figure 11B:
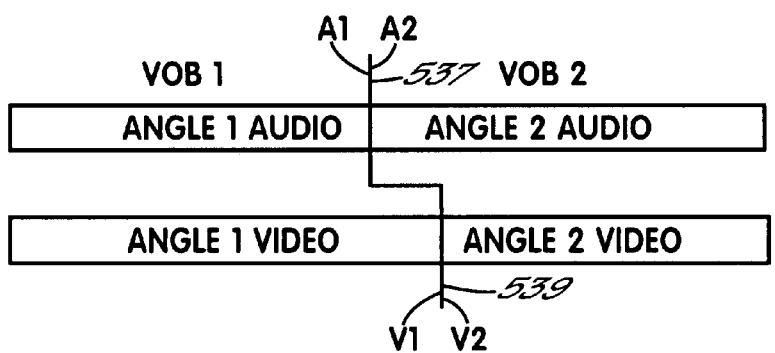
FIG. 11B is a schematic illustration of audio and video VOB data after a concatenation of two viewing angles.

When the VSTC time value reaches a value corresponding to the video PTS value $V_1$, as shown at 539 in FIG. 10, the RISC 80 moves the VSTC 88 backward in time by updating the VSTC 88 with the earlier time value corresponding to video PTS value $V_2$ into the VSTC 88. The net result is illustrated in FIG. 11B in which the angle 1 audio is concatenated with the angle 2 audio, and the angle 1 video is concatenated with the angle 2 video. At 537, the STC 86 is changed from a time value equal to the audio PTS value $A_1$ to a lesser time value equal to the lesser audio PTS value $A_2$. Thus, the playback of audio is smoothly switched from the end of angle 1 audio to the beginning of angle 2 audio. Further, at 539, the VSTC 88 is changed from a time value equal to the video PTS value $V_1$ to a lesser time value equal to the lesser video PTS value $V_2$. Thus, the play back of video is smoothly switched from the end of angle 1 video to the beginning of angle 2 video. It is possible that there may be a momentary loss of synchronization between the audio and video; however, the synchronization is quickly restored with a minimum of distortion as, in the standard play operation, the RISC 80 subsequently updates the time value in the VSTC 88 with the time in the STC 86. As will be appreciated, providing the ability to independently set the STC 86 and VSTC 88 to different time values substantially enhances the flexibility of the digital audio/video processor 30 (FIG. 1). Further, it permits a great many trick play modes to be performed seamlessly and with a minimum of distraction to the viewer.

While the invention has been illustrated by the description of a preferred embodiment and while the embodiment has been described in considerable detail, there is no intention to restrict nor in any way limit the scope of the amended claims to such detail. Additional advantages and modifications will readily appear to those who are skilled in the art. For example, the above description of operation does not utilize the byte counts in the PTS tables 302, 324 of FIG. 5. As will be appreciated, due to interrupt priorities and other processing and communications delays in the ASIC 36, the identification of the write pointer to be loaded in the PTS tables 302, 324 may be imprecise. In an alternative embodiment, the byte counts in the PTS tables 302, 324 may be used instead of the write pointer data to identify the location in the FIFO's 300, 320 of respective audio and video data associated with the PTS values in the PTS tables 302, 324.

Further, while the STC 86 is described as being clocked in real time by the DMUX 52, as will be appreciated, the STC 86 may be clocked and maintained in real time by other devices within the digital audio/video processor 30.

One example of using both the STC 86 and the VSTC 88 to independently drive the play back of audio and video frames, respectively, is described with respect to FIG. 11 and an angle change selection made by the user. As will be appreciated, there are other play back options which may simultaneously utilize both the STC 86 and the VSTC 88, for example, a fast forward play back mode is available which does not mute the audio during the fast forward play back operation. With that playback option, the STC 86 and the VSTC 88 may be used to drive the play back of respective decoded audio and video frames in a manner similar to that described with respect to FIG. 11.

Therefore, the invention in its broadest aspects is not limited to the specific details shown and described. Consequently, departures may be made from the details described herein without departing from the spirit and scope of the claims which follow.

What is claimed is:

1. A method of operating a digital audio/video processor comprising a demultiplexer receiving raw audio and video data representing respective audio and images to be displayed and providing demultiplexed audio and video data for storage in a memory and a CPU for decoding the demultiplexed audio and video data from the memory and playing back decoded audio and video data in response to user selections to selectively play back the audio and video data in a standard mode or a trick play mode, the audio and video data including respective audio and video presentation time stamp ("PTS") values, each audio and video PTS value representing a desired time and sequence of presentation of respective audio and video data, and the video data including video PTS values representing a desired time and sequence of presentation of the video data, the method comprising:

incrementing a first system time clock in real time to provide first time values;

comparing in response to the standard play mode, the first time values of the first system time clock with the audio and video PTS values;

generating in response to the standard play mode, a playback and display of the audio and video data associated with respective audio and video PTS values in response to each of the respective audio and video PTS values being approximately equal to the first time values in the first system time clock; and incrementing a second system time clock with the CPU in response to the decoded data to provide second time values.

2. The method of claim 1 further comprising periodically advancing the second system time clock to a second time value equal to a current first time value of the first system time clock in response to the standard play mode.

3. The method of claim 2 wherein the decoded video data includes a series of frames of decoded video data and the method further comprises periodically advancing the second system time clock to a second time value equal to a current first time value of the first system time clock with each frame of decoded video data.

4. The method of claim 1 further comprising:

comparing in response to the trick play mode, the second time values of the second system time clock with the video PTS values;

generating in response to the trick play mode, a playback and display of video data associated with the respective video PTS values in response to each of the respective video PTS values being approximately equal to the second time values in the second system time clock.

5. The method of claim 4 further comprising periodically setting the first system time clock to a first time value equal to a current second time value of the second system time clock in response to the trick play mode.

6. The method of claim 1 further comprising:

generating in response to the trick play mode, a display of unchanging video; and halting in response to the trick play mode the incrementing of the second system time clock by the CPU to provide a constant time value in the second system time clock.

7. The method of claim 6 further comprising:

detecting a selection by the user of the standard play mode;

updating the first system time clock with the constant time value from the second system time clock;

comparing in response to the standard play mode, the first time values of the first system time clock with the audio and video PTS values; and generating in response to the standard play mode, a playback of audio and video data associated with the respective audio and video PTS values in response to each of the respective audio and video PTS values being approximately equal to the first time values in the system time clock.

8. The method of claim 6 wherein the decoded video data includes a series of frames of video data further comprising:

updating the first system time clock with the constant time value from the second system time clock;

advancing the second system time clock by an increment corresponding to a frame of video data to provide a new time value; and generating a playback and display of a frame of video data associated with the new time value in the second system time clock.

9. The method of claim 8 further comprising iterating the steps of updating, advancing and generating in response to a continued selection of the trick play mode by the user.

10. The method of claim 1 further comprising:

detecting in response to the trick play mode a next video PTS value being less than a current video PTS value;

detecting in response to the trick play mode a next audio PTS value being less than a current audio PTS value;

setting in response to the trick play mode the second system time clock to a value equal to the next video PTS value; and setting in response to the trick play mode the first system time clock to a value equal to the next audio PTS value.

11. A digital audio/video processor receiving audio and video data representing images to be displayed, selected portions of the audio and video data including respective audio and video presentation time stamp ("PTS") values, each audio and video PTS value representing a desired time and sequence of presentation of respective audio and video data, the processor being responsive to user selections to selectively play back the video data in a standard play mode and a trick play mode, the processor comprising:

a demultiplexer for receiving the raw video data and providing demultiplexed video data;

a memory for storing the demultiplexed video data;

a first system time clock providing first time values in response to being continuously clocked by the demultiplexer;

a CPU for decoding the demultiplexed audio and video data from the memory and playing back decoded audio and video data as a function of the respective audio and video PTS values;

a second system time clock providing second time values in response to being periodically incremented by the CPU in response to the decoded video data, the CPU periodically setting the second system time clock to a second time value equal to a current first time value of the first system time clock in response to the standard play mode, and periodically setting the first system time clock to a first time value equal to a current second time value of the second system time clock in response to the trick play mode.

* * * * *